United States Patent [19]

Segerson et al.

[11] Patent Number: 4,533,209

[45] Date of Patent: Aug. 6, 1985

[54] CONNECTORLESS FIBER OPTIC PACKAGE

[75] Inventors: Eugene E. Segerson, Tempe; Floyd L. Thomas, Mesa, both of Ariz.

[73] Assignee: Mototola, Inc., Schaumburg, Ill.

[21] Appl. No.: 544,679

[22] Filed: Oct. 24, 1983

[51] Int. Cl.³ .............................................. G02B 7/26
[52] U.S. Cl. .................................. 350/96.20; 357/74
[58] Field of Search .............. 350/96.15, 96.17, 96.18, 350/96.20, 96.21, 96.22; 250/227; 357/17, 19, 74

[56] References Cited

U.S. PATENT DOCUMENTS

| 4,030,809 | 6/1977 | Onishi et al. | 350/96.21 |
| 4,181,401 | 1/1980 | Jensen | 350/96.21 |
| 4,327,964 | 5/1982 | Haesly et al. | 350/96.20 |
| 4,461,537 | 7/1984 | Raymer, II et al. | 350/96.20 |
| 4,479,696 | 10/1984 | Lubin et al. | 350/96.20 |

Primary Examiner—John Lee

[57] ABSTRACT

A package for optoelectronic devices is disclosed having means for receiving the end of an optical fiber. The package fastens to the fiber by means of a collet chuck which is part of the package. The chuck is closed by rotating a collar.

13 Claims, 5 Drawing Figures

CONNECTORLESS FIBER OPTIC PACKAGE

This invention relates to packages for semiconductor devices and, in particular, to a package for an optoelectronic device.

In the prior art there are a variety of techniques disclosed for attaching an optical fiber to a semiconductor device such as a light emitting diode (LED) or a photodetector. All these techniques require special parts, fittings, or a "kit" to make the physical connection between the fiber and the semiconductor device. Other techniques require that a fitting be pre-formed on, and permanently attached to, the end of the optical fiber.

There are, however, many situations in which one wishes to use a fiber optic link between electronic devices but not be burdened with an inventory of the necessary piece parts and/or all possible lengths of fiber which might be used. For example, in appliances, automobiles or other vehicles, machine tools, or among machines in a factory, the administrative costs of the components may well exceed the cost of the components themselves, which itself may be high for an inventory of a large number of different parts.

In view of the foregoing, it is therefore an object of the present invention to provide a connectorless package for an electro-optical device, i.e., a package not requiring additional hardware to make the connection.

Another object of the present invention is to provide a package for semiconductor devices which can be used with bare optical fiber, i.e., optical fiber without connector fittings formed on or attached to the end thereof.

A further object of the present invention is to provide a low cost connector for electro-optical devices.

Another object of the present invention is to provide a connector for electro-optical devices which does not require separate parts.

The foregoing objects are achieved in the present invention wherein the package comprises a first chamber for receiving an electro-optical device and a second chamber, aligned with the first, for receiving the end of an optical fiber. The second chamber is surrounded by a collar which forms a collet chuck with the walls of the second chamber. The chamber is constricted about the fiber by rotation of the collar, which has a non-circular bore. The collar comprises an inwardly extending ridge at one end thereof for engaging a relief in the body of the package, thereby providing a rotatable attachment to the body. The electro-optical device is inserted into the first chamber so that the window, aperture, or other access to the light sensitive part of the device is facing the second chamber. The body of the package is provided with fastening or index means for locating the package when it is attached to some other member, such as a printed circuit board, and for protecting the electrical leads protruding from the package.

A more complete understanding of the present invention can be obtained by considering the following detailed description in conjunction with the accompanying drawings, in which.

Figure 1:
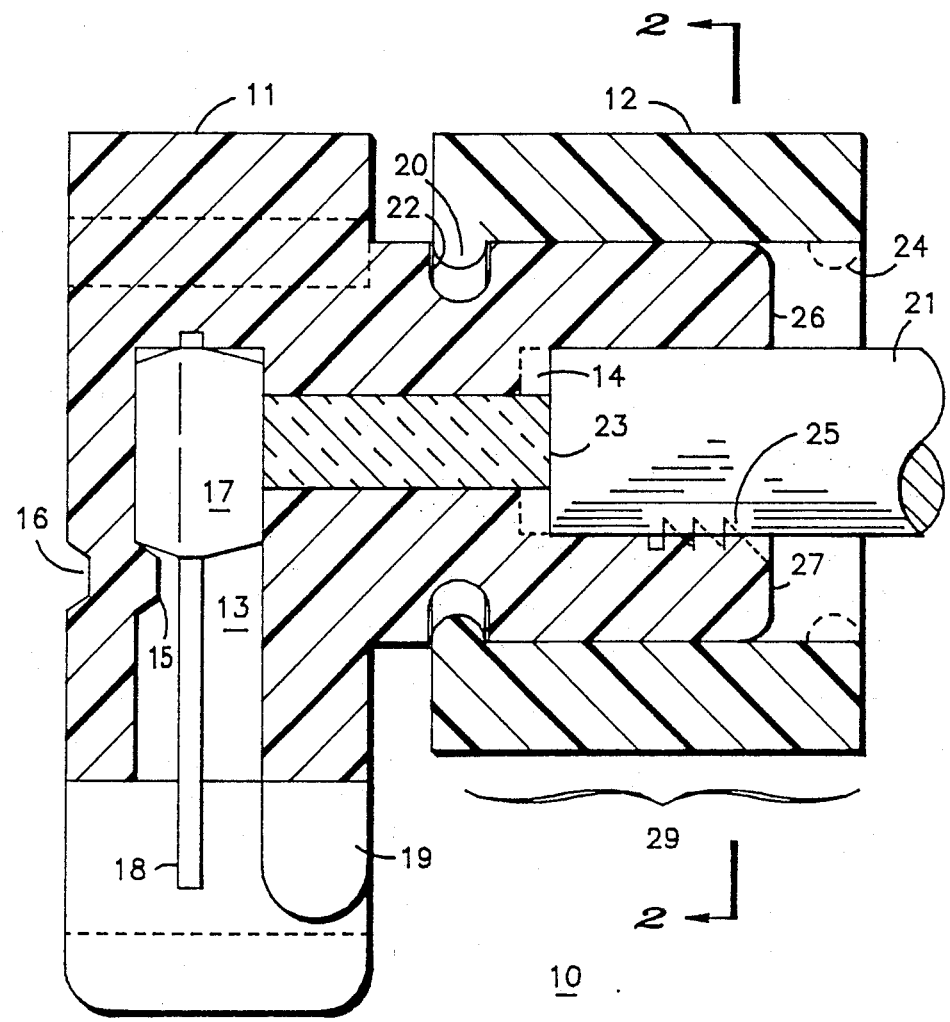
FIG. 1 illustrates a preferred embodiment of the present invention.

FIG. 1 illustrates a preferred embodiment of the present invention in which package 10 comprises two parts, a body 11 formed of a suitable, resilient plastic and collar 12 which encircles a portion of body 11. Body 11 defines two chambers, 13 and 14, for receiving an optoelectronic device and an optical fiber, respectively. The outer wall of chamber 13 is deformed to form protrusion 15 and dimple 16 which serve to lock optoelectronic device 17 in place within chamber 13.

Protrusion 15 is formed by deformation of the outer wall of chamber 13; for example, by ultrasonic means, cold flow, or hot flow of the plastic. In so doing, optoelectronic device 17 is secured to body 11 without the use of adhesives and without requiring the alignment of some pre-existing features on the wall of chamber 13 and the exterior of optoelectronic device 17. Thus the assembly of the optoelectronic device and body 11 is considerably simplified.

Optoelectronic device 17 comprises at least two leads, represented in FIG. 1 by lead 18, which extend from chamber 13 to outside body 11. Located adjacent to lead 18 is protrusion 19 which extends from body 11 in generally the same direction as lead 18. Protrusion 19 serves to both protect lead 18 and to locate package 10 when attached to some other structure, such as a printed circuit board.

Insulated or jacketed fiber 21 is inserted into chamber 14 such that the end of fiber 21 abuts the end of a short segment of optical fiber 23, which serves to optically connect chambers 13 and 14. The axis of optical fiber 21 intersects chamber 13 and, in particular, intersects the photoactive area of photoelectronic device 17. It is preferred to use segment 23 to provide optical coupling, although segment 23 could be eliminated and chamber 14 extended further into body 11 to bring the end of fiber 21 closer to the photoactive area of optoelectronic device 17. In view of the small size of package 10, it is preferred to leave additional material within body 11 and use segment 23, which has a smaller diameter than fiber 21, to obtain optical coupling.

Walls 26 and 27 of chamber 14 do not completely surround fiber 21 but comprise at least one split so that the size of chamber 14 can be reduced by means of collar 12. Collar 12 and walls 26 and 27 comprise collet chuck 29 which serves to locate and grip fiber 21, securing it to body 11. Collar 12 preferably includes bead 20 on the inner surface of at least one end thereof for engaging relief or cove 22, thereby providing a means for attaching collar 12 to body 11 yet allowing collar 12 to rotate about the axis of optical fiber 21 and chamber 14. Cove 22 serves a second function in that it also reduces the material connecting walls 26 and 27 to body 11 thereby increasing the flexibility of the connecting portion of body 11 so that walls 26 and 27 may be moved inwardly more easily.

The outside surface of walls 26 and 27 is preferably cylindrical whereas the inside surface of collar 12 is preferably non-circular. Thus as collar 12 is rotated, the smaller diameter portions thereof engage walls 26 and 27 compressing them against optical fiber 21 thereby securing optical fiber 21 to body 11. One may prefer to provide bead 24 on the inner surface of the other end of collar 12 so that collar 12 is symmetrical and can be attached with either end engaging cove 22. In order to be able to rotate collar 12 by hand, the outside surface of collar 12 is textured in a manner known in the art.

To further enhance the retention of optical fiber 21, it is preferred to provide serrations 25 along at least a portion of the inner surface of chamber 14. The serrations are formed such that it is easier to insert fiber 21 than to withdraw it, even without collar 12 being rotated so as to reduce the size of chamber 14.

Figure 2:
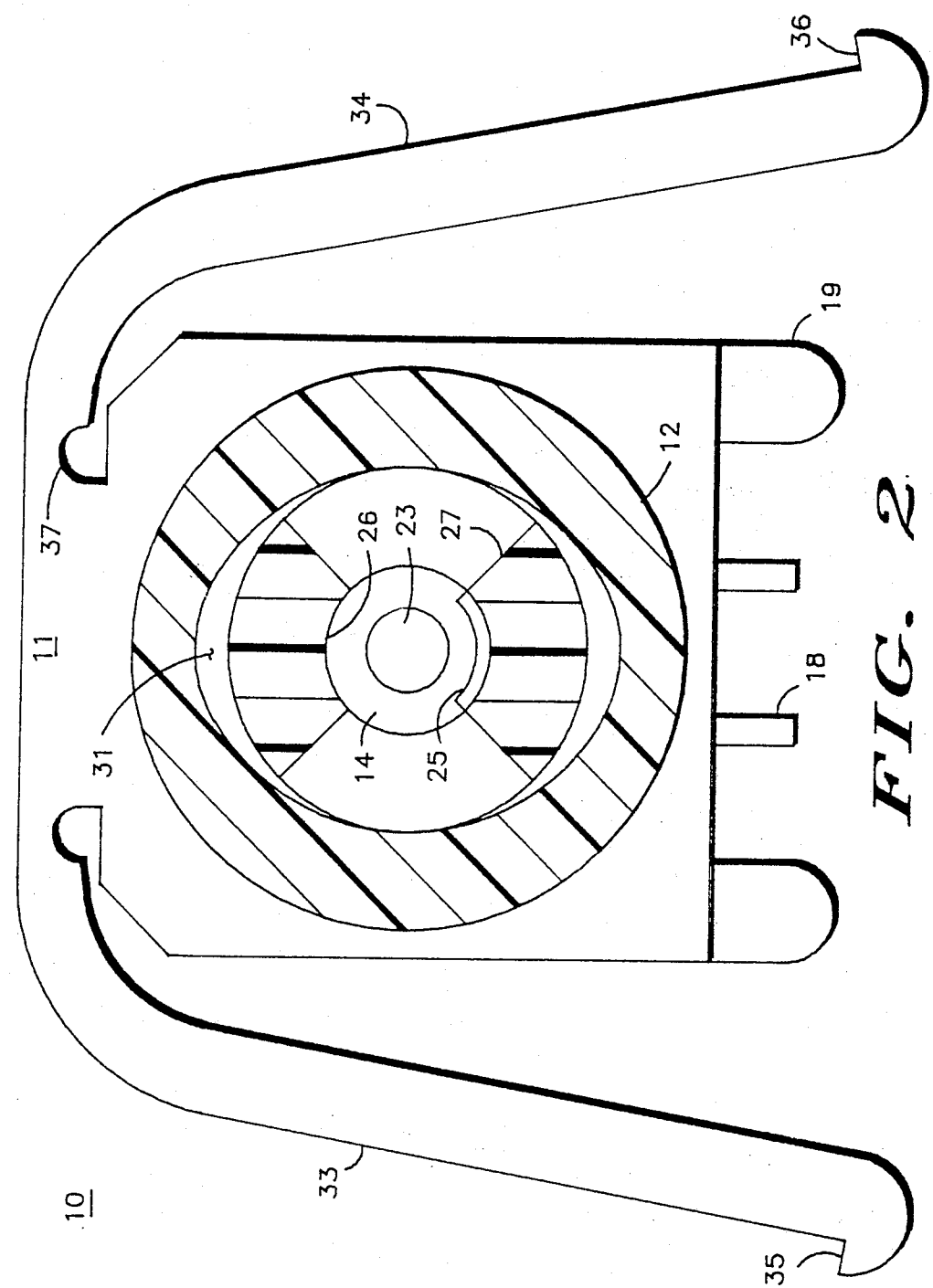
FIG. 2 illustrates an end view of a preferred embodiment of the present invention.

FIG. 2 illustrates an end view, with partial cross section, of the package in accordance with the present invention, those parts which also appear in FIG. 1 bear the same reference numeral. As illustrated in FIG. 2, in the open position, clearance 31 is provided between the inner surface of ring 12 and wall 26 of chamber 14. A similar clearance is obtained between wall 27 and the lower, inner surface of ring 12. While illustrated in a preferred embodiment as comprising two splits, it will be appreciated by those of skill in the art that the wall surrounding chamber 14 may have any number of splits, depending upon the size of the plastic, the strength of the plastic, and similar considerations. For example, one may prefer to provide three splits in the wall surrounding chamber 14 to obtain a self-centering action when ring 12 is rotated to constrict the size of chamber 14. In this case, the inner surface of ring 12 must be provided with three lobes rather than the two illustrated in FIG. 2. In operation, with three splits in the wall surrounding chamber 14, ring 12 must be rotated only one-sixth of a complete rotation to effect constriction about the fiber. With the device as illustrated in FIG. 2, ring 12 must be rotated one-fourth of a turn to effect constriction.

In a preferred embodiment of the present invention body 11 is provided with means for fastening the package to another member or structure, such as a printed circuit board. As illustrated in FIG. 2, this fastening means comprises a pair of arms 33 and 34 with shoulders 35 and 36, respectively, at the extremities thereof. As manufactured, the arms are slightly splayed from the rest of body 11. In use, the arms are urged against the sides of body 11 and inserted through suitable bores or holes in the structure to which the package is to be attached. The arms then try to return to the splayed position thereby urging shoulders 35 and 36 underneath a suitable latch mechanism in the structure, e.g., the underside of the printed circuit board to which the package is attached. As with the walls of chamber 14, suitable reliefs, such as relief 37, may be formed in a portion of arms 33 and 34 to increase the resiliency thereof.

Figure 3:
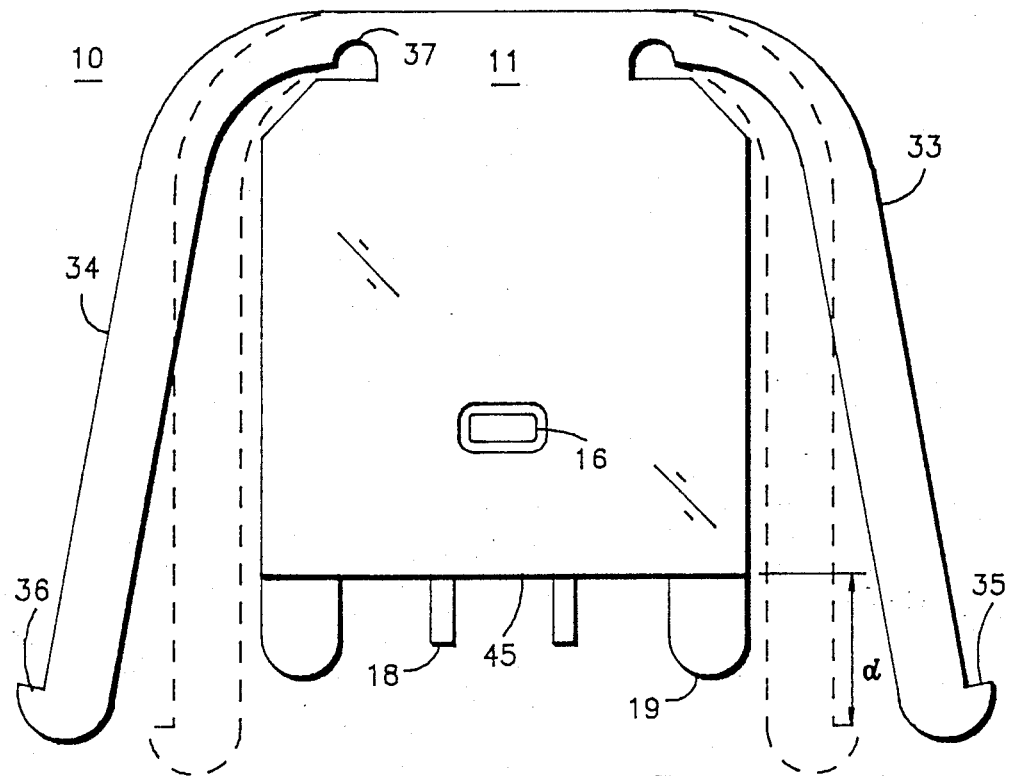
FIG. 3 illustrates a snap connection mechanism for securing the package of the present invention to some other structure.

FIG. 3 illustrates the attachment of the optoelectronic device to body 11. Specifically, as molded or otherwise formed, body 11 comprises smooth walls about chamber 13. A suitable optoelectronic device is inserted into chamber 13 and the wall deformed to lock the device in place. In a preferred method for assembling the package in accordance with the present invention, an ultrasonic bonding tool is applied to area 16 which causes the plastic to flow slightly, forming a depression, as seen outside the package. In so doing, one obviates the need for adhesives yet obtains a secure connection between the optoelectronic device and body 11.

As illustrated in FIG. 3, moving arms 33 and 34 to a position adjacent the remainder of body 11 defines a gap between the lower surface of body 11 and shoulder 35. This gap having a distance d defines either the thickness of the board to which the package is attached or the depth of the locking mechanism on the structure to which package 10 is attached.

Figure 4:
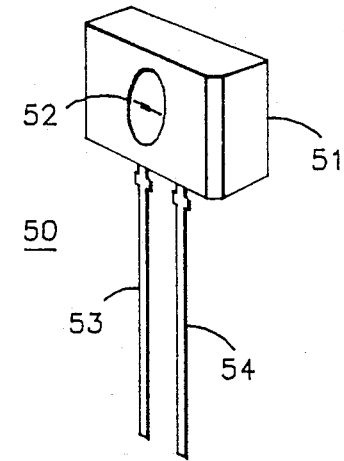
FIG. 4 illustrates an opto-electronic device for use in the package of FIG. 1.

FIG. 4 illustrates a photoelectronic device suitable for use in the package of the present invention. Specifically, device 50 comprises a body of suitable encapsulating material having aperture 52 formed therein through which light can be emitted or received. Extending from body 51 are at least two electrical leads, 53 and 54, for providing electrical connection to the semiconductor device encapsulated within body 51. The outside surface of body 51 is complementary to the shape of the inner surface of chamber 13, thereby providing a close but not tight fit between device 50 and chamber 13. Thus, device 50 is readily inserted into chamber 13 during assembly.

Figure 5:
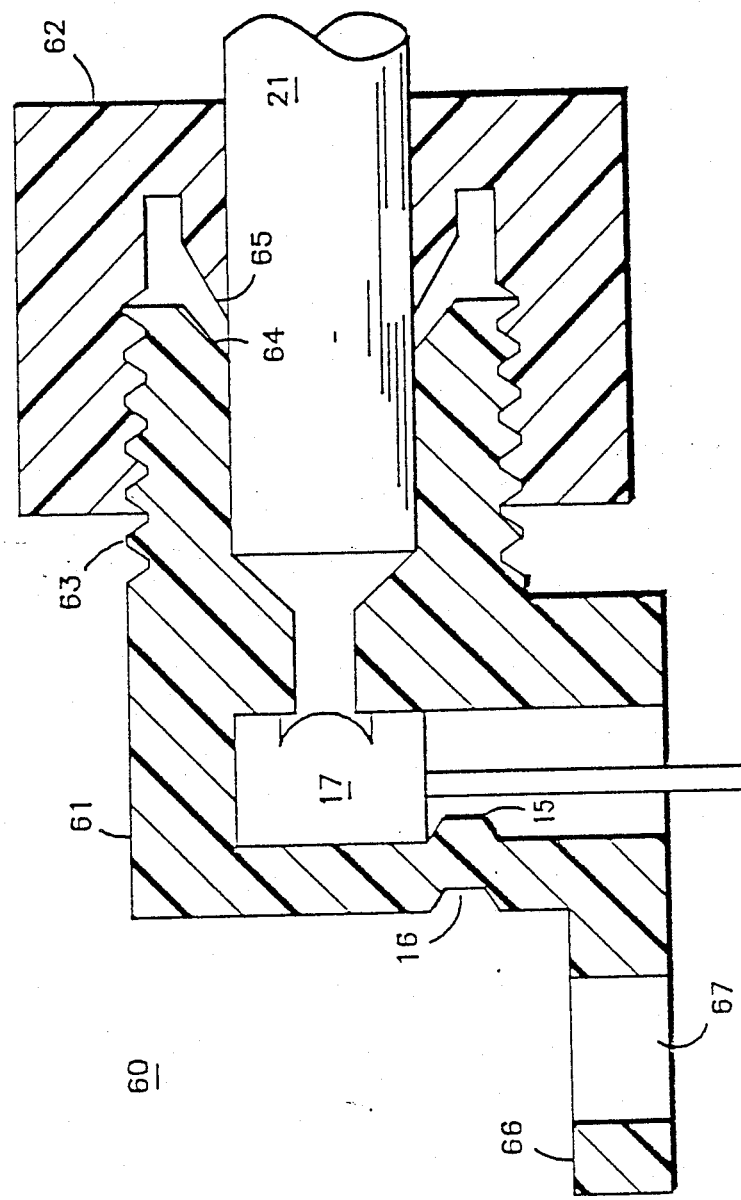
FIG. 5 illustrates an alternate embodiment of the present invention.

FIG. 5 illustrates an alternative embodiment of the present invention in which a multi-turn fastening means is used to secure the optical fiber to the package. Specifically, package 60 comprises two parts: body 61 and collar 62. Body 61 comprises a chamber for receiving optoelectronic device 17, which is fastened within the chamber by protrusion 15. Tab 66 is formed in body 61 and defines hole 67, by which body 61 can be fastened to other structures, e.g. a printed circuit board.

As with the embodiment of FIG. 1, body 61 defines a second chamber for receiving the end of an optical fiber. Unlike the embodiment of FIG. 1, the outside of the walls of the chamber are threaded at 63 to receive collar 62, which is threaded on the inside. Within collar 62 is a tapered neck 65 having a bore therein approximately equal to the outside diameter of optical fiber 21. The end of the chamber in body 61 has a taper 64 greater than taper 65 of the neck; i.e., the angle formed with respect to the axis of fiber 21 is larger for taper 64 than for taper 65. For example, but not by way of limitation, a ten degree difference in taper has been found suitable. Thus, as collar 62 is tightened, the tapers meet and the end of taper 65 constricts about optical fiber 21. Additionally, the inner end of fiber 21 is urged against the end of the chamber, thereby assuring good optical coupling between optoelectronic device 17 and fiber 21.

There is thus provided by the present invention an improved, low cost, package for optoelectronic devices in which bare optical fiber, i.e., fiber having no fittings formed on or attached to the end thereof, can be securely attached to the package.

Having thus described the invention it will be apparent to those of skill in the art that various modifications can be made within the spirit and scope of the present invention. For example, the configuration of the fastening means can be readily changed to suit the particular application for the package. The orientation of device 17 and chamber 13 can be changed to suit the particular optoelectronic device being used. For example, many devices on the market emit or detect light through the surface thereof located opposite to the electrical leads. Body 11/61 and collar 12/62 may comprise any suitable plastic and need not be of the same material. For example, but not by way of limitation, suitable plastics are thermoplastics such as nylon or polyester. It is understood that the particular materials chosen depends upon the use to be made of the present invention. For example, where electromagnetic interference must be avoided, the body may comprise metal while the collar comprises plastic. The trade-off is cost since the body is then considerably more expensive to make. Similarly, fiber 23 may comprise any suitable single or multistrand optical fiber. While tapered neck 65 preferably encircles fiber 21, it can be segmented to reduce tangential compression. The portion of optical fiber 21 within chamber 14 can be obtained by removing the jacket from the end portion of the optical fiber or by using a separate segment which is inserted into the package prior to inserting the optical fiber. In some applications, the segment can be omitted.

We claim:

1. An article comprising:
    a body of plastic material defining first and second chambers, the first of said chambers being adapted to receive an electro-optical device and the second of said chambers being adapted to receive the end of an optical fiber;
    said first and second chambers being aligned so that the axis of the second chamber intersects the first chamber;
    collar means surrounding at least a portion of said second chamber, said collar means being rotatable about said body and engaging said body for securing said optical fiber to said body.

2. The article as set forth in claim 1 wherein said collar and said body comprise threaded surfaces.

3. The article as set forth in claim 2 wherein said collar and said body comprise complementary taper portions for securing said optical fiber to said body.

4. The article as set forth in claim 1 wherein said collar comprises a non-circular bore and said second chamber comprises a collet having a split wall.

5. The article as set forth in claim 4 wherein said body has a reduced thickness portion at the inner end of said collet for increasing the flexibility of said split wall.

6. The article as set forth in claim 5 wherein said reduced thickness portion comprises a cove formed in the outside surface of said body.

7. The article as set forth in claim 6 wherein said collar means comprises a bead formed on the inside surface of at least one end thereof for engaging said cove thereby rotatably attaching said collar to said body.

8. The article as set forth in claim 2 or 5 and further comprising an electro-optical device in said first chamber.

9. The article as set forth in claim 8 wherein said electro-optical device is held in place by a deformation in said body.

10. The article as set forth in claim 9 wherein said body comprises index means adjacent said electro-optical device.

11. The article as set forth in claim 2 or 4 and further comprising a segment of optical fiber for optically coupling said first and second chambers.

12. The article as set forth in claim 11 wherein the diameter of said segment is smaller than the diameter of said second chamber.

13. The article as set forth in claim 11 wherein at least a portion of the inside of the second chamber is serrated for making it easier to insert an optical fiber than to remove it.

* * * * *